Figure 1:
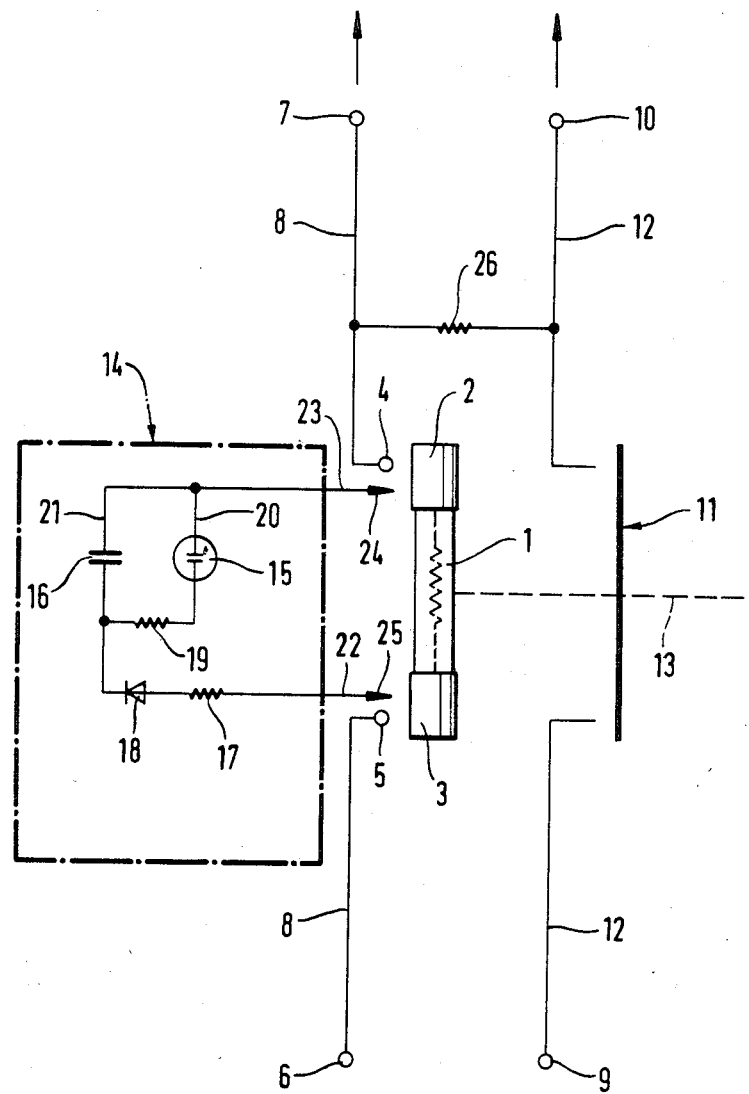

United States Patent [19]

Becker

[11] Patent Number: 4,556,874
[45] Date of Patent: Dec. 3, 1985

[54] FUSIBLE CIRCUIT BREAKER

[75] Inventor: Klaus Becker, Strullendorf, Fed. Rep. of Germany

[73] Assignee: Linder GmbH Fabrik Elektrischer Lampen und Apparate, Bamberg, Fed. Rep. of Germany

[21] Appl. No.: 409,901

[22] Filed: Aug. 20, 1982

[30] Foreign Application Priority Data

Aug. 21, 1981 [DE] Fed. Rep. of Germany ....... 3133094

[51] Int. Cl.$^4$ ............................................. G08B 21/00
[52] U.S. Cl. .................................... 340/638; 337/242; 340/639
[58] Field of Search ................. 340/638, 639; 337/242, 337/241, 265, 266, 332, 376; 324/133; 361/41, 104

[56] References Cited

U.S. PATENT DOCUMENTS

| | | | |
|---|---|---|---|
| 2,176,227 | 10/1939 | Schultz et al. | 337/172 X |
| 3,379,842 | 4/1968 | Downs et al. | 337/242 X |
| 3,831,089 | 8/1974 | Pearce | 324/133 X |
| 4,394,602 | 7/1983 | Apgar et al. | 337/242 X |

FOREIGN PATENT DOCUMENTS

| | | |
|---|---|---|
| 7503428 | 9/1976 | Netherlands .......................... 340/638 |
| 1124991 | 8/1968 | United Kingdom . |
| 1177135 | 1/1970 | United Kingdom . |
| 2058493 | 4/1981 | United Kingdom . |

OTHER PUBLICATIONS

Raphael, "Neon-Bulb Circuit Doubles as Pilot Light and Trouble Light", Electronic Design, Jan. 1970, p. 130.
van Beek, "Fuse Indicator", Elektor Book 75, 1977, p. 50.

*Primary Examiner*—James L. Rowland
*Assistant Examiner*—Daniel Myer
*Attorney, Agent, or Firm*—Spencer & Frank

[57] ABSTRACT

A fuse-type circuit breaker having a fuse link which is manually pivotal in a housing between an on position and an off position. The fuse link has contact caps which, when in the open position, short-circuit two current contacts which are fixed to the housing. Also provided is an operating state indicator device which includes a light source for the fuse link. The indicator device, at least in the on position, is electrically connected with the two contact caps of the fuse link and with the two current contacts. The indicator device is in parallel with the latter and is provided with a very high electrical resistance relative to the fuse link. The indicator device is in the form of a blinker which incorporates a capacitor, a first diode connected ahead of the capacitor, and a charging resistor as well as a glow lamp connected in parallel with the capacitor and in series with a discharging resistor.

18 Claims, 8 Drawing Figures

FIG. 4 　　　　　　　　FIG. 7
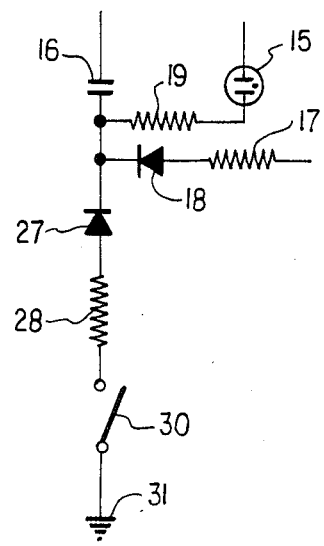 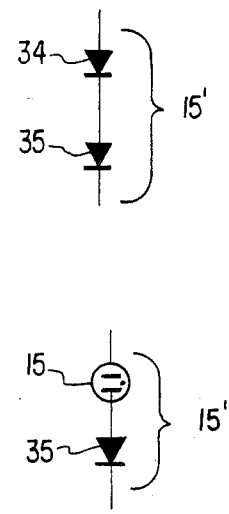
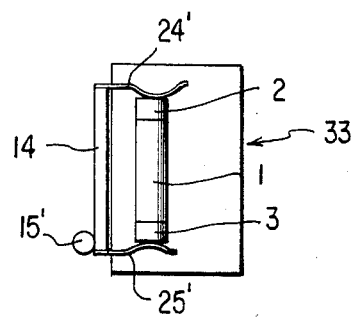 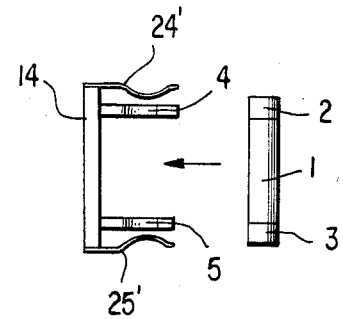
FIG. 5 　　　　　　　　FIG. 6

FUSIBLE CIRCUIT BREAKER

The invention relates to a fuse-type circuit breaker having the features of the preamble of claim 1. Such a circuit breaker is known, for example, from French Pat. No. 75/34,564 (Publication Number 2,331,881) in conjunction with French Pat. No. 78/00,514. A fuse cartridge is pivotal in a housing by means of a handle so that in the on position its contact caps rest between two current contacts which are fixed to the housing. The contact connected with the current mains will hereinafter be abbreviatedly called the "hot" contact and the contact connected with the load will hereinafter be abbreviatedly called the "cold" contact.

By pivoting the fuse link into the off position, the current path is interrupted and the load is disconnected from the mains. In the off position, the fuse link can now be exchanged in a known manner.

In the housing of the fuse-type circuit breaker in French Pat. No. 78/00,514 there is additionally provided an electrical operating state indicator device in that a glow lamp operated between the cold contact and the ground conductor via a resistance multiplier lights up when the fuse is switched on and is in order. This device has its drawbacks, particularly because when there is a phase short-circuit on the cold side of the fuse, the glow lamp of the indicator device lights up even if the fuse is burnt out; and the service life of the light source (e.g. glow lamp) is relatively short due to its being operated continuously, so that an erroneous indication exists when the glow lamp is burnt out. In particular, the operator cannot easily decide, when the lamp is not lit, whether only the lamp is defective or the fuse link has responded to a case of malfunction.

It is the object of the invention to design a fuse-type circuit breaker including an operating state indicator device for the fuse link so that the operator can recognize quickly and reliably in which state the fuse link is at the time. It should be assured, that in the off position, there exists a complete, galvanic separation of the indicator device from the current conducting phase. This is accomplished by the characterizing features of claim 1.

Initially, the fuse-type circuit breaker according to the invention is of advantage since only the case of a malfunction (fuse defective) is indicated. The light source (glow lamp) of the indicator device indicates a malfunction particularly also if a phase short-circuit exists on the cold side of the fuse.

By arranging the contacts for the electrical connection of the contact cap(s) of the fuse link with the indicator device, a complete galvanic separation of the entire indicator device from the other current-conducting members of the circuit breaker is assured in the off position so that exchange of the fuse link can be performed by the operator without danger.

By arranging a high resistance auxiliary resistor between the phase conductor protected by the fuse link and the grounded conductor, the indicator device will operate also if no load is connected on the cold side of the fuse. Selectively, this high resistance auxiliary resistor may also be connected with another grounded component, preferably the installation bus bar.

The electrical connection between the phase conductor and the grounded conductor or ground, respectively, established by means of the auxiliary resistor is interrupted in an advantageous and simple manner when the fuse link is pivoted into the off position.

In a further embodiment of the invention, a supplemental electrical arrangement is proposed which provides that the grounded conductor or possibly also the ground conductor is electrically connected, via a decoupling diode and a resistor, with one terminal of the discharging resistor. With this additional arrangement, the operator is now able to determine at a glance the state of the fuse or the switching state of the entire fuse-type circuit breaker. In this connection, the following applies:

(a) glow lamp lit continuously; the fuse is in order and switched on;
(b) glow lamp not lit: the fuse is switched off;
(c) glow lamp blinks: the fuse is defective but switched on.

This indicator device, which differentiates between the different operating states (a) through (c), is here constructed of the simplest electrical switching means.

To extend the service life of the glow lamp, the connection between the glow lamp and the grounded conductor may be able to be switched on and off in an advantageous manner so that the operator can switch off the state of the lamp being continuously lit. If the switch is designed as a push button switch, actuation of the switch will tell the operator at a brief glance in which state the switching system happens to be. It is also possible to provide one (push button) switch for a plurality of circuit breakers equipped with a plurality of indicator devices, so that if one push button switch is actuated a whole series of indicator glow lamps are caused to light up continuously if the conditions according to (a) are met.

Advantageously, the entire indicator device may be mounted in a sliding switch which can be pushed into the circuit breaker housing. This provides an opportunity to be able without significant modifications or installations to furnish the fuse-type circuit breaker either with or without indicator device, depending on the customer's desire. Moreover, the customer can subsequently equip an already installed circuit breaker at any time and without danger with the respectively desired sliding switch.

It is known to arrange so-called actuation indicators at one frontal face end of elongate fuse links. Since circuit breakers are often installed in poorly illuminated basement areas, it is of particular advantage for the glow lamp to illuminate such an actuation indicator. In this way the operator has a double control of the circuit breaker.

A spatially favorable arrangement with secure contacts of the further contacts is realized in that the indicator device is provided with at least one further contact which is designed as a contact spring disposed next to a current contact and is closed exclusively in the on position.

The invention will now be explained in greater detail with reference to the drawings. It is shown in:

FIG. 1, a basic circuit diagram for one embodiment of the invention as defined in claims 1 and 2.

Figure 2:
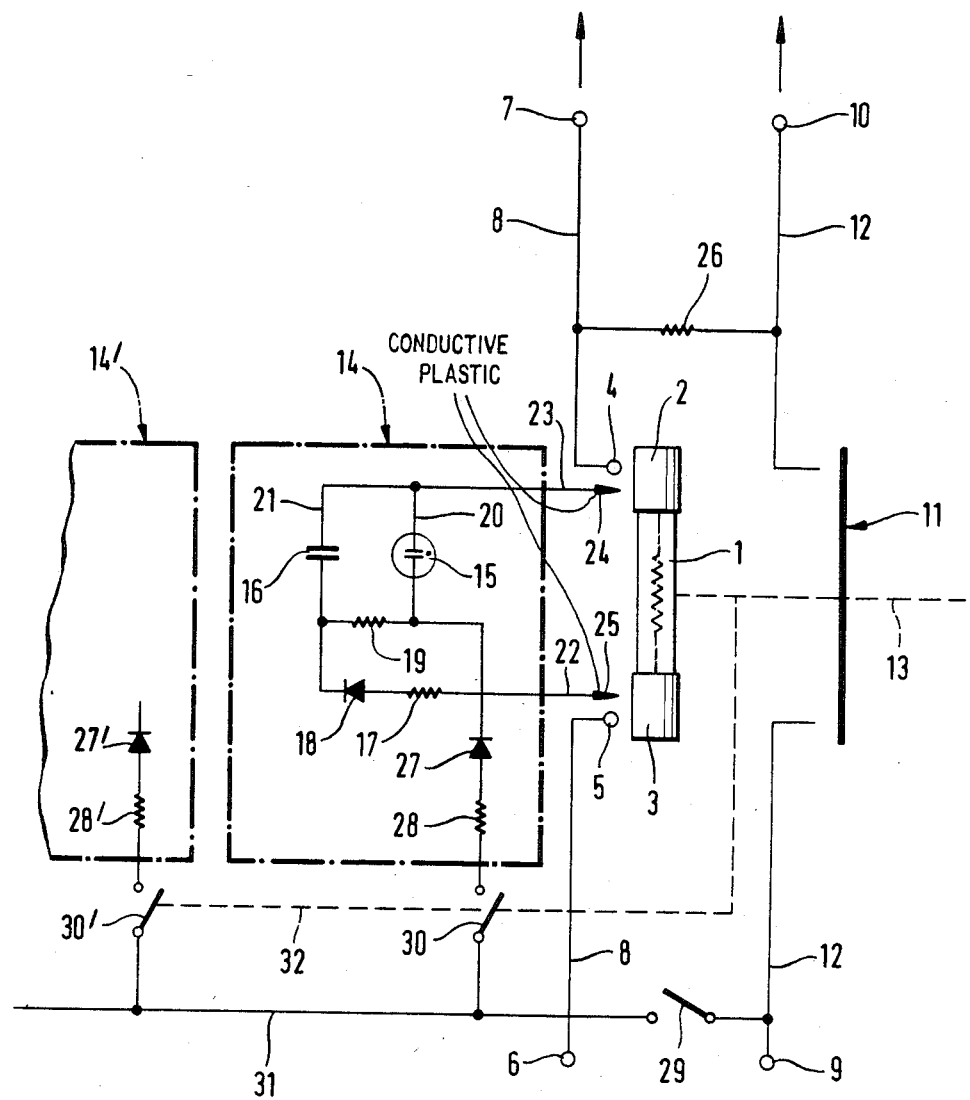
Figure 3:
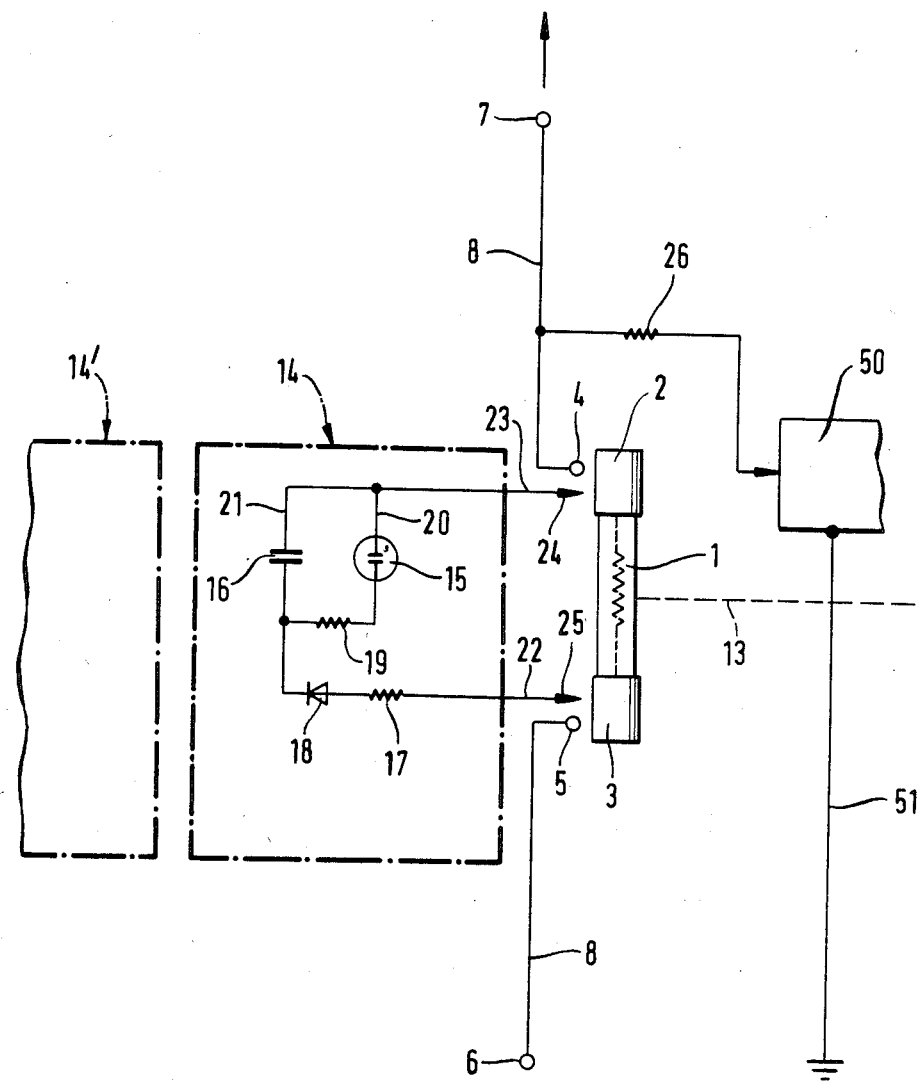

FIG. 2, a basic circuit diagram for another embodiment of the invention with disconnectable supplemental device for monitoring the switching system;

FIG. 3, a basic circuit diagram for a further embodiment of the invention with grounded auxiliary resistor;

FIG. 4, a basic circuit diagram for another embodiment having a third series circuit branch comprising a second (decoupling) diode and a further resistor, which connects a ground conductor with one terminal of a discharging resistor;

FIG. 5, a cross-sectional view of a pivotal switching slide carrying the fuse link, the indicator device, and the light source;

FIG. 6, a cross-sectional view of the indicator device and the fuse link in an off position, the input terminals of the indicator device shown as contact springs disposed adjacent respective current contacts for connection to a respective contact cap only when the fuse link is in the on position;

FIG. 7, a basic circuit diagram in which the light source is comprised of a trigger diode and a light-emitting diode; and FIG. 8, a basic circuit diagram in which the light source is comprised of a glow lamp and a light-emitting diode.

The fuse-type circuit breaker includes a fuse link 1 which can be pivoted manually in a housing between an on position and on off position and whose contact caps 2, 3, in the on position, charge two current contacts 4, 5 which are fixed to the housing. The current contact marked 4 is the "cold" contact facing the load, the contact marked 5 is the "hot" contact facing the mains. If the fuse link 1 is in the on position, the current path disposed between terminals 6, 7 and formed of the fuse link 1 and the phase conductor 8 is closed. Between the further terminals 9, 10 there is disposed an electrical switch 11 which closes or interrupts the current path via the grounded conductor 12 and is mechanically coupled to the pivotal switching movement of the fuse link 1, as indicated by the dashed line 13.

An operating state indicator device, hereinafter abbreviatedly called an indicator device 14, essentially includes a light source 15 in the form of a glow lamp 15, a capacitor 16, a charging resistor 17, a first diode 18 connected in series therewith, as well as a discharging resistor 19 which is connected in series with the glow lamp 15 and forms a parallel branch 20 to the main branch 21 in which lies the capacitor 16. With its connecting lines 22, 23, the display device 14 can be connected with special contacts 24, 25, which are electrically and spatially separated from terminals 4, 5, with the contact caps 2, 3 of the fuse link 1 and with the terminals 4, 5 in the on position.

On the "cold" side of the fuse link 1, phase conductor 8 is connected with grounded conductor 12 via a high resistance auxiliary resistor 26. This auxiliary resistor may also be connected, as shown in FIG. 3, with a grounded component, for example the bus bar 50.

In a special embodiment, shown in FIG. 2, the parallel branch 20 may be connected, for example, between the glow lamp 15 and the discharging resistor 19 and via a second diode 27 and a further resistor 28, with the grounded conductor 12; this connection may be permanent or, preferably, is switchable by means of a manually actuated on/off switch or a push button 29.

The fuse-type circuit breaker with indicator device operates as follows:

If the fuse 1 is in the off position shown in the drawing (FIGS. 1–3), conductors 8 and possibly 12 are interrupted. If the operator switches on the fuse-type circuit breaker, fuse link 1 bridges the terminals 4, 5, so that the current path disposed between contacts 6, 7 is closed. Moreover, via contacts 24, 25, the indicator device 14 is connected to the phase conductor in parallel with fuse link 1. However, no significant amount of current flows through its main branch 21 or through the connecting lines 22, 23 and the electrical components contained therein, since the total resistance of the indicator device is very much higher than the total resistance of fuse link 1. If fuse link 1 responds to a malfunction and melts through, the voltage across the input of the indicator device increases and the blinker circuit comprising components 15, 16, 17, 18, 19 is put into operation. In any case, the auxiliary resistor 26 establishes a connection with the grounded conductor 12 if no load is connected to terminals 7, 10. This causes the capacitor 16 to be charged via the charging resistor 17 and the first diode 18 and when the firing voltage is reached in glow lamp 15, capacitor 16 is discharged again via the glow lamp and the discharging resistor 19, until the lighting voltage for the glow lamp is no longer reached. The result is that glow lamp 15 begins to blink once the fuse link has responded.

Components 27, 28, 29 of FIG. 2 constitute a modification of the indicator device of the fuse-type circuit breaker in that with the on/off switch (push button) 29 closed and fuse link 1 in proper working order and in the on position, glow lamp 15 is continuously supplied with current via the second diode 27 (decoupling diode) and the further resistor 28 and is continuously lit as long as fuse link 1 is in proper working order. This indicates a first operating state (see (a) above). If fuse link 1 burns through, glow lamp 15 begins to blink in the manner described above, thus indicating a second operating state (see (c) above). If the fuse-type circuit breaker is switched off altogether, the glow lamp also goes out, thus indicating a third operating state (see (b) above). To extend the service life of the glow lamp, the on/off switch 29 may be designed, for example, as a push button switch and be actuated by the operator only for a brief "fuse diagnosis". Here it is possible to check, via only a single switch 29, a whole series of fuse-type circuit breakers with their own connected indicator devices 14, 14', etc.; in that case, measures must of course be taken to mutually decouple the indicator devices 14, 14', perhaps in the form of further diodes 27' and further resistors 28'.

Proper operation of the device is assured if the essential electrical components have approximately the values listed below:

capacitor 16: 0.33 μF
charging resistor 17: 2.2 MΩ
further resistor 28: 330 KΩ
discharging resistor 19: 27 KΩ
auxiliary resistor 26: 4.7 MΩ

FIG. 2 shows a further embodiment of the fuse-type circuit breaker. Further switches 30, 30' are provided which connect the indicator devices with switch 29 via diodes 27, 27' and resistors 28, 28' and a bus bar 31. These switches 30, 30' are coupled mechanically with switch 11, as indicated by dashed line 32. This assures that the blinker circuit is electrically connected with bus bar 31 when the fuse-type circuit breaker is precisely in the on position.

FIG. 3 shows a further embodiment of the invention which has already been mentioned above. In this embodiment as well, the circuit essentially coincides with that of FIG. 1. In deviation from that figure, however, the auxiliary resistor 28 is not connected with the grounded conductor 12 but instead with the bus bar 50 which is grounded via a line 51. This design of the circuit can be realized to particular advantage in that the resistor is automatically contacted when it is pushed onto the bus bar. Contacting may here be effected directly or by means of a metallic holding claw which (releasably) secures the fuse-type circuit breaker on the bus bar. In the latter case, resistor 26 may be connected with the holding claw in the interior of the device. This embodiment has the advantage that the auxiliary resistor 26 can thus also make proper connection in devices not equipped with a zero potential terminal, without requiring a separate clamp or screw connection. Rather, grounding of the common bus bar is sufficient to automatically charge with the auxiliary potential, if required, a whole battery of fuse-type circuit breakers that are fastened on the bus bar.

FIG. 4 shows a further embodiment of the invention. A third series circuit branch comprises the second diode 27 and the further resistor 28, connecting the ground conductor 31 with one terminal of the discharge resistor 19.

FIG. 5 shows, in cross-section, a pivotal switching slide 33, generally indicated as a plate at 33, carrying the fuse link 1, the indicator device 14, and the light source 15'. FIGS. 7 and 8 show variations in which the light source 15' may be, respectively, a series connection of a trigger diode 34 and a light-emitting diode 35 or a series connection of a glow lamp 15 and a light-emitting diode 35.

FIG. 6 is a further cross-sectional view of the indicator device 14 and the fuse link 1 in the off position. Input terminals 24, 25 of the indicator device 14 are shown as contact springs 24', 25', respectively, disposed adjacent respective current contacts 4, 5 for connection to a respective contact cap 2, 3 of the fuse link 1 only when the fuse link 1 is manually moved into the on position.

I claim:

1. A fuse-type circuit breaker for use in a circuit arranged to connect a voltage source to a load, the circuit including phase conductors defining a phase conductor path, and a circuit ground, the circuit breaker comprising:
   a housing;
   two current contacts fixed to said housing, said two current contacts including a first current contact connectable via a respective phase conductor to the load and a second current contact connectable via a respective phase conductor to the voltage source;
   a fuse link having two contact caps and a fuse element connected between said contact caps, said fuse element having a normal operating state in which said fuse element provides a short circuit between said contact caps and having a malfunction response state in which said fuse element provides an open circuit between said contact caps, said fuse link being mounted in said housing to be manually movable between an on position in which each said contact cap is electrically connected to a respective current contact and an off position in which each said contact cap is electrically disconnected from the respective current contact;
   an operating state indicator device for said fuse link, said indicator device including two input terminals disposed to each be electrically connected to a respective one of said contact caps at least when said fuse link is in said on position and circuit means connected between said input terminals and providing, between said input terminals, an electrical resistance which is very high relative to the normal operating state resistance of said fuse element, said circuit means comprising: a capacitor, a diode and a charging resistor connected together in series to form a first series circuit branch connected between said input terminals; and a light source and a discharge resistor connected together in series to form a second series circuit branch connected in parallel with said capacitor, said indicator device being operative to cause said light source to produce a blinking light signal only when said fuse link is in said on position and said fuse element is in its malfunction response state;
   a high-resistance auxiliary resistor having a first end connected to said first current contact and a second end connectable to the circuit ground at least when said fuse link is in said on position; and
   second circuit means connected to said light source and including a switch member selectively connecting said light source to the circuit ground for applying to said light source a rectified current to cause said light source to produce a continuous light signal only when said fuse link is in said on position and said fuse element is in its normal operating state, whereby said light source produces: a blinking light signal only when said fuse link is in said on position and said fuse element is in its malfunction response state; a continuous light signal only when said fuse link is in said on position, said fuse element is in its normal operating state, and said second circuit means is connected to the circuit ground; and no light output when said fuse link is in said off position or when said fuse link is in said on position and said fuse element is in its normal operating state and said second circuit means is not connected to the circuit ground.

2. A fuse-type circuit breaker according to claim 1 wherein the circuit ground includes a grounded bus bar and said second end of said auxiliary resistor is connectable to the bus bar.

3. A fuse-type circuit breaker according to claim 1 wherein said second circuit means comprise a second diode and a further resistor connected together in series to form a third series circuit branch having a first end connected to said second series circuit branch at a point between said light source and said discharge resistor, and having a second end connectable to the circuit ground.

4. A fuse-type circuit breaker according to claim 3 wherein said third series circuit branch further comprises a switch which is arranged to be closed only when said fuse link is in said on position.

5. A fuse-type circuit breaker according to claim 3 further comprising switch means connected to said second end of said third series circuit branch for selectively disconnecting said third series circuit branch from the circuit ground.

6. A plurality of fuse-type circuit breakers each according to claim 3, and a single switch connected to said second end of said third series circuit branch of each said circuit breaker for selectively disconnecting each said third series circuit branch from the circuit ground.

7. A fuse-type circuit breaker according to claim 1 wherein said second circuit means comprise a second diode and a further resistor connected together in series to form a third series circuit branch having a first end connected to the end of said discharge resistor which is connected to said capacitor, and having a second end connectable to the circuit ground.

8. A fuse-type circuit breaker according to claim 7 further comprising switch means connected to said second end of said third series circuit branch for selectively disconnecting said third series circuit branch from the circuit ground.

9. A plurality of fuse-type circuit breakers each according to claim 8, and a single switch connected to said second end of said third series circuit branch of each said circuit breaker for selectively disconnecting each said third series circuit branch from the circuit ground.

10. A fuse-type circuit breaker according to claim 1 further comprising a switching slide carrying said fuse link and arranged to be pushed into said housing for connecting said contact caps to said current contacts, and wherein said indicator device is carried by said switching slide and said input terminals comprise permanent contacts connected to said contact caps when said fuse link is in said on position.

11. A fuse-type circuit breaker according to claim 1 wherein said indicator device is located adjacent one end of said fuse link and said light source illuminates the location of said indicator device.

12. A fuse-type circuit breaker according to claim 1 wherein at least one said input terminal of said indicator device comprises a contact spring disposed adjacent a respective current contact for connection to a respective contact cap only when said fuse link is in said on position.

13. A fuse-type circuit breaker according to claim 1 wherein said light source comprises a series connection of a trigger diode and a light-emitting diode.

14. A fuse-type circuit breaker according to claim 1 wherein said light source comprises a series connection of a glow lamp and a light-emitting diode.

15. A fuse-type circuit breaker according to claim 4 wherein said switch comprises a contact made of a conductive plastic.

16. A fuse-type circuit breaker according to claim 15 wherein said conductive plastic is a foamed material.

17. A fuse-type circuit breaker according to claim 1 wherein said input terminals comprise contacts made of a conductive plastic.

18. A fuse-type circuit breaker according to claim 17 wherein said conductive plastic is a foamed material.

* * * * *